US 11,074,272 B1

(12) United States Patent
Albert et al.

(10) Patent No.: US 11,074,272 B1
(45) Date of Patent: Jul. 27, 2021

(54) SYSTEM AND METHOD FOR MANAGING STREAMING CALCULATIONS

(71) Applicant: Seeq Corporation, Seattle, WA (US)

(72) Inventors: Nikhila Albert, Waukesha, WI (US); Dustin D. Johnson, White Salmon, WA (US); Brian Parsonnet, Fort Collins, CO (US)

(73) Assignee: Seeq Corporation, Seattle, WA (US)

( * ) Notice: Subject to any disclaimer, the term of this patent is extended or adjusted under 35 U.S.C. 154(b) by 173 days.

(21) Appl. No.: 16/224,619

(22) Filed: Dec. 18, 2018

Related U.S. Application Data

(60) Provisional application No. 62/609,180, filed on Dec. 21, 2017.

(51) Int. Cl.
*G06F 16/27* (2019.01)
*G06F 16/25* (2019.01)
*G06F 16/22* (2019.01)
*G06F 16/2458* (2019.01)

(52) U.S. Cl.
CPC ........ *G06F 16/278* (2019.01); *G06F 16/2272* (2019.01); *G06F 16/2477* (2019.01); *G06F 16/258* (2019.01)

(58) Field of Classification Search
CPC ........ G06F 17/18; G06F 19/00; G06F 16/278; G06F 16/2272; G06F 16/2477
USPC ......................................................... 707/737
See application file for complete search history.

(56) References Cited

U.S. PATENT DOCUMENTS

| 7,490,013 | B2 | 2/2009 | Wells |
| 8,086,598 | B1 | 12/2011 | Lamb et al. |
| 8,112,425 | B2 | 2/2012 | Baum et al. |
| 8,214,352 | B2 | 7/2012 | Lamb et al. |
| 8,290,931 | B2 | 10/2012 | Hong et al. |
| 8,312,027 | B2 | 11/2012 | Lamb et al. |
| 8,412,696 | B2 | 4/2013 | Zhang et al. |
| 8,515,963 | B1 | 8/2013 | Blank, Jr. et al. |
| 8,516,008 | B1 | 8/2013 | Marquardt et al. |
| 8,583,631 | B1 | 11/2013 | Ganapathi et al. |
| 8,589,375 | B2 | 11/2013 | Zhang et al. |
| 8,589,432 | B2 | 11/2013 | Zhang et al. |
| 8,671,091 | B2 | 3/2014 | Cherniack et al. |
| 8,682,886 | B2 | 3/2014 | Sorkin et al. |
| 8,682,925 | B1 | 3/2014 | Marquardt et al. |
| 8,700,674 | B2 | 4/2014 | Bear et al. |
| 8,751,486 | B1 | 6/2014 | Neeman et al. |
| 8,751,499 | B1 | 6/2014 | Carasso et al. |

(Continued)

FOREIGN PATENT DOCUMENTS

| WO | WO 2008-016877 | 2/2008 |
| WO | WO 2008-016878 | 2/2008 |

(Continued)

*Primary Examiner* — Hung T Vy
(74) *Attorney, Agent, or Firm* — Polsinelli PC

(57) ABSTRACT

A cursor demarcating a data set between a settled portion and an unsettled portion can be generated. A transformation can be applied to the data set, the transformation accounting for the cursor and transforming the settled portion of the data set differently than the unsettled portion of the data set in order to create a transformed output data set. The transformed output data set may further include a modified cursor based on the applied transformation and demarcating settled and unsettled portions of the transformed output data set.

10 Claims, 5 Drawing Sheets

(56) References Cited

U.S. PATENT DOCUMENTS

| | | |
|---|---|---|
| 8,752,178 B2 | 6/2014 | Coates et al. |
| 8,788,459 B2 | 7/2014 | Patel et al. |
| 8,788,525 B2 | 7/2014 | Neels et al. |
| 8,788,526 B2 | 7/2014 | Neels et al. |
| 8,806,361 B1 | 8/2014 | Noel et al. |
| 8,825,664 B2 | 9/2014 | Blank, Jr. et al. |
| 8,826,434 B2 | 9/2014 | Merza |
| 8,909,642 B2 | 12/2014 | Carasso et al. |
| 8,972,992 B2 | 3/2015 | Fletcher et al. |
| 8,978,036 B2 | 3/2015 | Fletcher et al. |
| 8,983,994 B2 | 3/2015 | Neels et al. |
| 8,990,184 B2 | 3/2015 | Baum et al. |
| 8,990,245 B2 | 3/2015 | Zhang et al. |
| 9,002,854 B2 | 4/2015 | Baum et al. |
| 9,015,716 B2 | 4/2015 | Fletcher et al. |
| 9,031,955 B2 | 5/2015 | Carasso et al. |
| 9,043,332 B2 | 5/2015 | Noel et al. |
| 9,043,717 B2 | 5/2015 | Noel et al. |
| 9,047,181 B2 | 6/2015 | Noel et al. |
| 9,047,246 B1 | 6/2015 | Rahut |
| 9,052,938 B1 | 6/2015 | Bhide et al. |
| 9,078,009 B2 * | 7/2015 | Bivolarsky ............ H04N 19/18 |
| 9,087,090 B1 | 7/2015 | Cormier et al. |
| 9,122,746 B2 | 9/2015 | Neeman et al. |
| 9,124,612 B2 | 9/2015 | Vasan et al. |
| 9,128,779 B1 | 9/2015 | Gladkikh et al. |
| 9,128,980 B2 | 9/2015 | Neels et al. |
| 9,128,985 B2 | 9/2015 | Marquardt et al. |
| 9,128,995 B1 | 9/2015 | Fletcher et al. |
| 9,129,028 B2 | 9/2015 | Zhang et al. |
| 9,130,832 B1 | 9/2015 | Boe et al. |
| 9,130,860 B1 | 9/2015 | Boe et al. |
| 9,130,971 B2 | 9/2015 | Vasan et al. |
| 9,142,049 B2 | 9/2015 | Fletcher et al. |
| 9,146,954 B1 | 9/2015 | Boe et al. |
| 9,152,682 B2 | 10/2015 | Ganapathi et al. |
| 9,152,929 B2 | 10/2015 | Carasso et al. |
| 9,160,798 B2 | 10/2015 | Patel et al. |
| 9,173,801 B2 | 11/2015 | Merza |
| 9,177,002 B2 | 11/2015 | Sorkin et al. |
| 9,185,007 B2 | 11/2015 | Fletcher et al. |
| 9,208,206 B2 | 12/2015 | Blank, Jr. et al. |
| 9,208,463 B1 | 12/2015 | Bhide et al. |
| 9,210,056 B1 | 12/2015 | Choudhary et al. |
| 9,215,240 B2 | 12/2015 | Merza et al. |
| 9,225,724 B2 | 12/2015 | Das et al. |
| 9,245,057 B1 | 1/2016 | Fletcher et al. |
| 9,248,068 B2 | 2/2016 | Merza |
| 9,251,221 B1 | 2/2016 | Murphey et al. |
| 9,256,501 B1 | 2/2016 | Rahut |
| 9,275,338 B2 | 3/2016 | Noel et al. |
| 9,276,946 B2 | 3/2016 | Coates et al. |
| 9,292,675 B2 | 3/2016 | Husain |
| 9,294,361 B1 | 3/2016 | Choudhary et al. |
| 9,356,934 B2 | 5/2016 | Das et al. |
| 9,363,149 B1 | 6/2016 | Chauhan et al. |
| 9,417,774 B2 | 8/2016 | Fletcher et al. |
| 9,426,045 B2 | 8/2016 | Fletcher et al. |
| 9,426,172 B2 | 8/2016 | Merza |
| 9,430,574 B2 | 8/2016 | Zhang et al. |
| 9,432,396 B2 | 8/2016 | Merza |
| 9,437,022 B2 | 9/2016 | Vander Broek |
| 9,442,981 B2 | 9/2016 | Blank, Jr. et al. |
| 9,471,362 B2 | 10/2016 | Bhide et al. |
| 9,491,059 B2 | 11/2016 | Fletcher et al. |
| 9,509,765 B2 | 11/2016 | Pal et al. |
| 9,514,175 B2 | 12/2016 | Swan et al. |
| 9,516,029 B2 | 12/2016 | Das et al. |
| 9,516,046 B2 | 12/2016 | Merza et al. |
| 9,516,052 B1 | 12/2016 | Chauhan et al. |
| 9,516,053 B1 | 12/2016 | Muddu et al. |
| 9,521,047 B2 | 12/2016 | Alekseyev et al. |
| 9,578,053 B2 | 2/2017 | Husain et al. |
| 9,582,557 B2 | 2/2017 | Carasso et al. |
| 9,582,585 B2 | 2/2017 | Neels et al. |
| 9,584,374 B2 | 2/2017 | Bingham et al. |
| 9,589,012 B2 | 3/2017 | Neels et al. |
| 9,590,877 B2 | 3/2017 | Choudhary et al. |
| 9,591,010 B1 | 3/2017 | Muddu et al. |
| 9,594,789 B2 | 3/2017 | Baum et al. |
| 9,594,814 B2 | 3/2017 | Miller et al. |
| 9,594,828 B2 | 3/2017 | Neeman et al. |
| 9,596,146 B2 | 3/2017 | Coates et al. |
| 9,596,252 B2 | 3/2017 | Coates et al. |
| 9,596,253 B2 | 3/2017 | Chauhan et al. |
| 9,596,254 B1 | 3/2017 | Muddu et al. |
| 9,607,414 B2 | 3/2017 | Hendrey |
| 9,609,009 B2 | 3/2017 | Muddu et al. |
| 9,609,011 B2 | 3/2017 | Muddu et al. |
| 9,614,736 B2 | 4/2017 | Fletcher et al. |
| 9,646,398 B2 | 5/2017 | Yuan et al. |
| 9,648,037 B2 | 5/2017 | Merza |
| 9,660,930 B2 | 5/2017 | Vlachogiannis et al. |
| 9,667,640 B2 | 5/2017 | Filippi et al. |
| 9,667,641 B2 | 5/2017 | Muddu et al. |
| 9,699,205 B2 | 7/2017 | Muddu et al. |
| 9,715,329 B2 | 7/2017 | Deklich et al. |
| 9,733,974 B2 | 8/2017 | Bingham et al. |
| 9,740,755 B2 | 8/2017 | Lamas et al. |
| 9,740,788 B2 | 8/2017 | Blank, Jr. et al. |
| 9,747,316 B2 | 8/2017 | Baum et al. |
| 9,747,351 B2 | 8/2017 | Boe et al. |
| 9,753,909 B2 | 9/2017 | Miller et al. |
| 9,753,961 B2 | 9/2017 | Boe et al. |
| 9,753,974 B2 | 9/2017 | Marquardt et al. |
| 9,754,359 B2 | 9/2017 | Yuan et al. |
| 9,754,395 B2 | 9/2017 | Fletcher et al. |
| 9,756,068 B2 | 9/2017 | Merza |
| 9,760,240 B2 | 9/2017 | Maheshwari et al. |
| 9,762,455 B2 | 9/2017 | Bingham et al. |
| 9,785,886 B1 | 10/2017 | Andoni et al. |
| 9,818,060 B2 | 11/2017 | Husain |
| 10,007,686 B2 | 6/2018 | Lawande et al. |
| 10,037,128 B2 | 7/2018 | Mehta et al. |
| 2011/0218978 A1 | 9/2011 | Hong et al. |
| 2012/0317094 A1 | 12/2012 | Bear et al. |
| 2014/0006777 A1 | 1/2014 | Amiri |
| 2015/0149134 A1 | 5/2015 | Mehta et al. |
| 2015/0178286 A1 | 6/2015 | Dhollander et al. |
| 2015/0220850 A1 | 8/2015 | Husain |
| 2015/0262060 A1 | 9/2015 | Husain et al. |
| 2016/0196527 A1 | 7/2016 | Bose et al. |
| 2016/0299966 A1 | 10/2016 | Dhollander et al. |
| 2017/0017901 A1 | 1/2017 | Firooz et al. |

FOREIGN PATENT DOCUMENTS

| | | |
|---|---|---|
| WO | WO 2010-062994 | 6/2010 |
| WO | WO 2010-091191 | 8/2010 |
| WO | WO 2011-008807 | 1/2011 |

* cited by examiner

US 11,074,272 B1

SYSTEM AND METHOD FOR MANAGING STREAMING CALCULATIONS

CROSS-REFERENCE TO RELATED APPLICATION

This application is related to and claims priority under 35 U.S.C. § 119(e) from U.S. Patent Application No. 62/609,180, filed Dec. 21, 2017 entitled "SYSTEM AND METHOD FOR MANAGING STREAMING CALCULATIONS," the entire contents of which is incorporated herein by reference for all purposes.

TECHNICAL FIELD

Aspects of the present disclosure relate to performing transformations on streaming data.

BACKGROUND

Sensor measurement data is commonly saved as an historical record of a physical process being monitored by the sensors, often along with other observational, manual, calculated, simulated, or related data and metadata associated with the process. While the data in the historic record may be perceived as certain, or "settled," there is often a need to modify the historic record. For example there may be a need to update the record with verified data in order to more accurately represent the historical facts. In some instances, portions of a record may not be settled due to issues arising from varying data latency (delay of arrival), timestamp error, signal noise, replacement of erroneous or missing data. Supposedly settled data can also be affected by combining multiple data sources to create better derived estimations, to refine or correct metadata, or to reinterpret conclusions or calculations based on data arriving after the calculations have completed and being applied in hindsight. As a result, output generated based in part on data subject to change will also be subject to change.

Stored data is ostensibly for future use and presumably impacting an ongoing, continuous, or future analysis, decision, or automation, among other actions. For example, a valve may be intended to maintain an optimal flow of a contained gas by automatically opening and closing in response to changing heat and pressure values. Opening and/or closing the valve can have a certain and immutable impact that cannot be undone. In such cases, the actions (e.g., opening or closing the valve) may have been made based on data that is subject to change and this fact can have far reaching ramifications for systems of record, issues of human responsibility, and work processes. It may be useful to differentiate action based on the likelihood of the data changing or it may be important (e.g., for assigning responsibility or detecting errors) to have some record of the likelihood of the data changing.

In some fields, calculations involving multiple data sources are common. For example, the manufacturing field involves multiple sensors each providing live, or "streaming," data to a processor for calculations. In such cases, the calculation may be run periodically and without concern for variable "streaming" data rates and/or variable latency, and data will always be made available for the calculation through extrapolating or interpolating missing values; however, subsequent data from the data stream may make previous results incorrect. Alternatively, a calculation can be run at only a point in time when all streams have provided data for the calculation, resulting in accurate and invariant results, but consequently delayed. However, the latter approach is also incapable of providing provisional and/or "in-progress" results.

It is with these observations in mind, among others, that various aspects of the present disclosure were conceived.

SUMMARY

Embodiments of the invention concern systems and methods for generating a data demarcating settled and unsettled data. In a first embodiment, a method can include accessing, by a hardware processor, a data set and a reference object, the data set ordered along a dimension and the reference object demarcating a first ordered portion of the data set from a second ordered portion of the data set, and the first ordered portion preceding the reference object along the dimension and the second ordered portion following the reference object along the dimension, wherein values of the first ordered portion are settled and values of the second ordered portion are unsettled, dividing, by the hardware processor, the data set into a first partition including a first portion of the data set and a second partition including a second portion of the data set, optimizing, by the hardware processor, one of a first transformation or a second transformation based on a relative position along the dimension of the reference object to one of the first portion of the data set and the second portion of the data set, and yielding one of an optimized first transformation or an optimized second transformation, applying, by the hardware processor, one of the first transformation or the optimized first transformation to the first portion of the data set, and yielding a transformed first portion of the data set, applying, by the hardware processor, one of the second transformation or the optimized second transformation to the second portion of the data set, and yielding a transformed second portion of the data set, and generating, by the hardware processor, an aggregated data set having the transformed first portion of the data set and the transformed second portion of the data set.

In one embodiment, the method further includes providing a first copy of the reference object to the first partition and a second copy of the reference object to the second partition, and wherein optimizing one of the first transformation or the second transformation is based on a relative position along the dimension of one of the first copy of the reference object and the second copy of the reference object.

In one embodiment, the method further includes outputting a reference object demarcating a first portion of the aggregated data set from a second portion of the aggregated data set. In one embodiment, the one of the first partition or the second partition comprises a plurality of partitions and each partition of the plurality of partitions comprises a portion of the data set, and wherein one of a transformation or an optimized transformation is applied to each of the plurality of partitions. In one embodiment, each partition of the plurality of partitions receives a copy of the reference object. In one embodiment, the entirety of the data set is contained across an aggregation of the partitions.

In one embodiment, one of the optimized first transformation and the optimized second transformation includes fewer calculations than one of the first transformation or the second transformation, and one of the first transformation or the second transformation is optimized based on the reference object being positioned along the dimension after one of the first portion of the data set or the second portion of the data set.

In one embodiment, the reference object is positioned along the dimension at an interim point of one of the first portion of the data set and the second portion of the data set, the interim point between a first point and a second point of one of the first portion of the data set and the second portion of the data set, and one of the optimized first transformation or the optimized second transformation includes a first set of calculations applied to points preceding the interim point and a second set of calculations applied to points following the interim point.

In another embodiment, a method for generating a demarcation for a data set can include generating, by a hardware processor, a reference object associated with an accessed data set, the reference object demarcating a first ordered portion of the data set from a second ordered portion of the data set, the first ordered portion preceding the reference object along the dimension and the second ordered portion following the reference object along the dimension, labeling, by the hardware processor, values of the first ordered portion as settled by changing metadata associated with each respective value of the first ordered portion; and labeling, by the hardware processor, values of the second ordered portion as unsettled by changing metadata associated with each respective value of the second ordered portion.

In one embodiment, the method may further include receiving, by the hardware processor, a transformation to apply to the accessed data set, applying, by the hardware processor, the transformation to the accessed data set, wherein the applied transformation factors in the reference object for the values of the second ordered portion to produce a transformed data set; and generating, by the hardware processor, an output data set comprising the transformed data set and one of the reference object or a transformed reference object.

In one embodiment, labeling the values of the second ordered portion comprises changing the metadata associated with each respective value of second ordered portion according to a continuous value of uncertainty, and wherein applying the transformation further factors in the continuous value of uncertainty for a plurality of values of the second ordered portion. In one embodiment, the dimension is time. In one embodiment, the reference object comprises an input cursor associated with a last accessed data point within the accessed data set and the second ordered portion comprises predicted values based on the first ordered portion.

In one embodiment, the accessed data set comprises a first input data stream and a second input data stream, the first input data stream associated with a first reference object that demarcates a first ordered portion of the first input data stream from a second ordered portion of the first input data stream, the second input data stream associated with a second reference object that demarcates a first ordered portion of the second input data stream from a second ordered portion of the second input data stream, and further comprising applying the transformation to the first input data stream and the second input data stream with reference to the respective first reference object and the second reference object to generate the result in the form of a transformed output data stream, the transformed output data stream including a third reference object that demarcates between a settled output portion of the output data stream and an unsettled output portion.

In one embodiment, the accessed data set comprises a first input data stream and a second input data stream, the first input data stream associated with a first reference object that demarcates a first ordered portion of the first input data stream from a second ordered portion of the first input data stream, the second input data stream associated with a second reference object that demarcates a first ordered portion of the second input data stream from a second ordered portion of the second input data stream.

In one embodiment, the reference object is based on a variable received with the accessed data set. In one embodiment, the reference object is computed in real time as the data set is accessed and by applying calculations as data is settled. In one embodiment, the reference object is modified.

In another embodiment, a non-transitory computer-readable medium may store computer-executable instructions that cause one or more processors to access a data set and a reference object, the data set ordered along a dimension and the reference object demarcating a first ordered portion of the data set from a second ordered portion of the data set, and the first ordered portion preceding the reference object along the dimension and the second ordered portion following the reference object along the dimension, wherein values of the first ordered portion are settled and values of the second ordered portion are unsettled, divide the data set into a first partition including a first portion of the data set and a second partition including a second portion of the data set, optimize one of a first transformation or a second transformation based on a relative position along the dimension of the reference object to one of the first portion of the data set and the second portion of the data set, and yielding one of an optimized first transformation or an optimized second transformation, apply one of the first transformation or the optimized first transformation to the first portion of the data set, and yielding a transformed first portion of the data set, apply one of the second transformation or the optimized second transformation to the second portion of the data set, and yielding a transformed second portion of the data set, and generate an aggregated data set comprising the transformed first portion of the data set and the transformed second portion of the data set, and an output reference object demarcating a first portion of the aggregated data set from a second portion of the aggregated data set.

In one embodiment, one of the first partition and the second partition comprises a plurality of partitions and each partition of the plurality of partitions comprises a distinct portion of the data set, and wherein one of a transformation or an optimized transformation is applied to each of the plurality of partitions.

DETAILED DESCRIPTION

Figure 1:
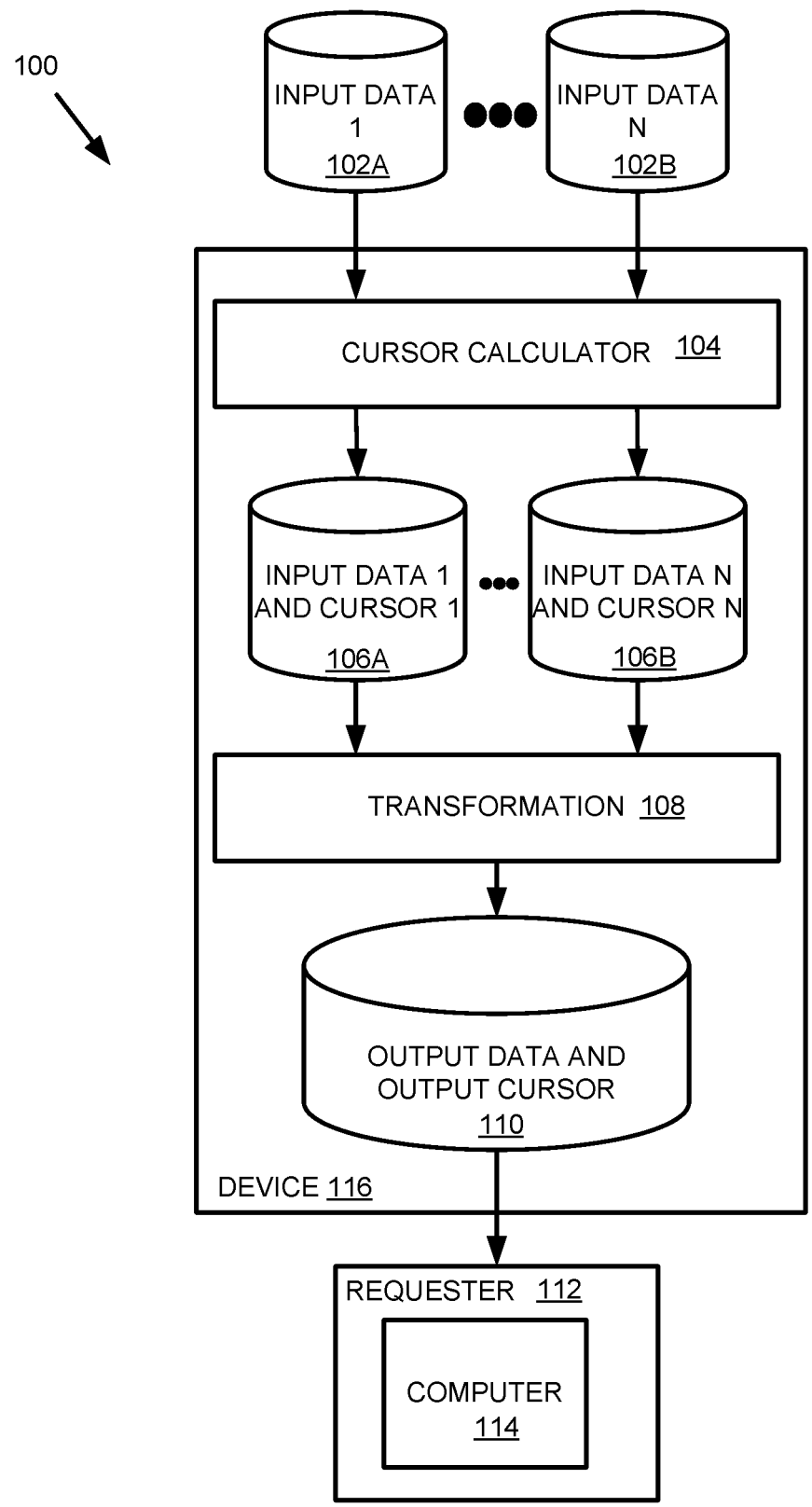
FIG. 1 is a diagram illustrating a data latency management system, in accordance with various embodiments of the subject technology.

Ordered input data can be processed by algorithms including, for example, transformations and calculations, to generate correspondingly ordered output data. In one embodiment, the ordered output data can include a reference object to a demarcation point along a dimension upon which the data is ordered. The demarcation point can differentiate, for example, data that is settled from data that is unsettled or merely provisional. Users of the ordered output data can then use the demarcation point, referred to herein as a "cursor," in determining how to record, manage, calculate, and/or communicate the data, or provide the output data to other systems and processes that may use it as a respective input. The cursor may be based on time or a timestamp, which may or may not be an attribute of the data or data stream itself, as well as other attributes of the data which can be used to connote a demarcation point between settled and unsettled data.

Ordered input data may constitute a set of data points. Data points or sets of points may be recorded with an associated timestamp or timestamps, representing a time of measurement, a time of recording, a time of arrival to the recording device, or other meaningful time references. Metadata can be included or associated with the ordered input data and may represent measurement accuracy, precision, tolerance, confidence, variability, source, handling, processing information, or other information to inform proper use and interpretation of the associated ordered input data. Even when correctly arranged in order, data points have varying levels of certainty distinguishable by a demarcation along an ordered sequence. In other words, a timestamp alone may fail to inform a reviewer whether the data associated with the timestamp, before the timestamp, or after the timestamp have any shared values or qualities of stability.

The reinterpretation of events is a particularly challenging situation. For example, early warnings or other indicators of impending failure (or, conversely, an unanticipated opportunity) may justify immediate actions (e.g., further investigation, a change in operations, initiation of repairs, etc.), only to find later on that the events unfolded differently than indicated or anticipated. Along the same lines, subsequent events may unfold so as to make previously uncertain past records certain by providing opportunity for the recorded data and dependent calculations to be assessed as being correct or properly interpreted. The above phenomena may delineate a means for workflows, work processes, and calculations to handle "subject to change," "unlikely to change," and other variants differently.

The delineation discussed above is referred to in this disclosure as the "settled" (or, conversely, "unsettled") nature of the data. For the sake of explanation, and without imputing any limitations, 100% certain data (such as data that has been directly observed) would naturally be conceptually deemed as immutable or settled, whereas 0% certainty (such as data that is entirely speculative and yet to be observed) would imply that the data, related data, and/or metadata may change, is uncertain, provisional or the like and thus the data is unsettled. It is to be understood that other measures, either continuous or discrete, of unsettledness may be used and that unsettled data is such because it represents only one possibility (intended to be the most likely possibility) in a set of potentially infinite future variants. To be clear, unsettled data may change but does not always or necessarily change. Moreover, the unsettled data itself may not change, but some related data or metadata, for example, may change or not yet be available and upon which the settled nature of the data itself depends, and hence the data cannot be considered settled until the related data, metadata, etc., is received, correlated, considered in a computation, etc.

Recording, managing, calculating, and communicating data can include, without limitation, decisions or algorithms that determine when to store, cache, or discard data; when to calculate or recalculate dependent assessments or calculations; visual representations of certainty; logical and mathematical operations; propagation of certainty through dependent calculations; and optimizing the methodology in support of partitioning and distributing calculations for scale.

Calculation environments may deal with a static data set or with a data set that is continuously or periodically refreshed with new data, with or without the loss of previous data. The non-static environment is commonly referred to as "streaming" and may include transformations being updated to address new inputs. Latency relates to the notion that newly arriving data inherently lags behind some actual measurement, due to physical, transport, processing, or network delays, among other things. Furthermore, each input may have a different latency from other inputs, and each of the input latencies may itself be variable.

Another characteristic of calculation environments is "partitionability," where an algorithm, calculation, search, or other transformation may be broken into smaller parts which are apportioned to other processing systems and the results reassembled in a manner that precisely reconstructs an end result as if no such partitioning has occurred. Partitioning provides speed advantages over non-partitioning systems. Ideally, partitioning should operate without a priori knowledge of the nature of the data and transformation being applied while still guaranteeing that the reassembled result is idempotent (both reproducible and traceable) and the same as if such calculation were performed without partitioning.

It is natural to think of the stream of data as being updated in time, meaning that the key, or continuously updating dimension, is a timestamp associated with incoming values. However, the key dimension is not limited to time and may be any such dimensions along which data can be ordered. For example, any monotonically increasing physical or quantitative value may serve as a key. As discussed herein, and for non-limiting explanatory purposes only, the key is portrayed in the context of time.

The data streams may be characterized by multiple traits and behaviors. They may be time-value pairs, or samples, having a numeric, string, arbitrary scalar, or other static value and may be of the sort typically used to represent continuous signals. Alternatively, they may also be events, meaning instants or moments in time, or they may be states, which span a range in time (having a start time and an end time).

The streams may be stored in and accessed through databases and can be continuously updated as time progresses. The streams may have multiple and various sources such as temperature sensors, light sensors, and pressure sensors. The stream may have different or variable sample frequencies. For example, and without imputing limitation, a pressure sensor and a temperature sensor may transmit reading updates every second and every half-second, respectively. Further, the streams may have different and variable latencies, as discussed above. The example pressure sensor and temperature sensor may each transmit respective signals over different media such as wireless signal and cable, respectively. Where a signal over a cable may have consistent latency, a wirelessly transmitted signal may have a higher latency than that over the cable and also a highly variable latency as arbitrary changes in the intervening space between transmitter and receiver occur.

A device having a processor to perform calculations, such as a computer or a server, may receive one or more of the streams as input. For example, a server may monitor or otherwise receive or access a stream of pressure measurement data and a stream of temperature measurement data. Continuing the example, the calculation may include a time range over which to execute an algorithm using the pressure measurement data and the temperature measurement data. Results of a calculation may be in the form of a stream and/or can also be in the form of a non-streaming output value, such as a single number, which can be labeled with settled status (e.g., "settled" or "unsettled") associated with an output cursor so as to denote a point in the streaming input up to which the corresponding non-streaming output value may be considered settled. For example, a time and corresponding data value may be associated with the output cursor and inform a requesting user that the output value is settled up to that time.

Further, variable sample frequencies and variable latencies may cause the results of the calculations to be within a window of unsettledness for any time range that includes a stream, at the time of calculation, lacking a data value. For example, where a temperature sensor and a pressure sensor stream data at unaligned timestamps, the most recent calculation may always be within a window of unsettledness because the temperature sensor streams a temperature value when the pressure sensor stream is in between updates, and vice versa.

As depicted by FIG. 1, a streaming calculation system 100 can compute calculation results for any time range of 1 to N streaming input data 102A-B. The system 100 will compute the calculation results within an unsettledness window, such as that discussed above in reference to the example temperature and pressure sensor combination, and identify results that are settled and invariant as well as results that are provisional and subject to change with, in one example, a minimum or optimal use of computation resources. The streaming input data 102A-B is transmitted to a device 116 which is capable of receiving data and contains a processor able to perform calculations and algorithms included in data transformations. In some embodiments, the device 116 can be a personal computer or other computing device receiving streaming data over, for example, a network connection, accessing data from a database, or directly receiving data streams from a sensor, in various possible examples. In some embodiments, the device 116 may be a server or other device. For example, without imputing limitation, device 116 can be a specialized server capable of receiving and processing large volume and high frequency streaming data.

In one specific example, there is a one-to-one correspondence between input streams and cursors. In such an example, each input stream is associated with a cursor, whether the stream is provided with a cursor or the cursor is computed separately. But ultimately, each input stream to a transformation has a cursor prior to the execution of the transformation. As noted elsewhere, the cursor may be implicitly or explicitly defined. Similarly, each output stream from the transformation includes an associated output cursor.

While the examples herein provided are of streaming data, it is to be understood that any ordered (e.g., time series) data may be used. For example, and without imputing limitation, where a data set includes longitudinal data covering a span of years such as in the case of academic research studies, the longitudinal data may be processed in sequence based on associated time values of each data record. Such time values may be included directly with the data or may instead be associated to the data as metadata. The ordered data may then be processed in appropriate sequence, in which case it can be treated as streaming data. Unlike actual streaming data, however, the "stream" may be paused and restarted or otherwise manipulated in ways that may be unavailable for a "live" stream or otherwise require additional resources such as buffers and the like. Nevertheless, both streaming and recorded data may be similarly processed by the systems and methods discussed in this disclosure.

Figure 2:
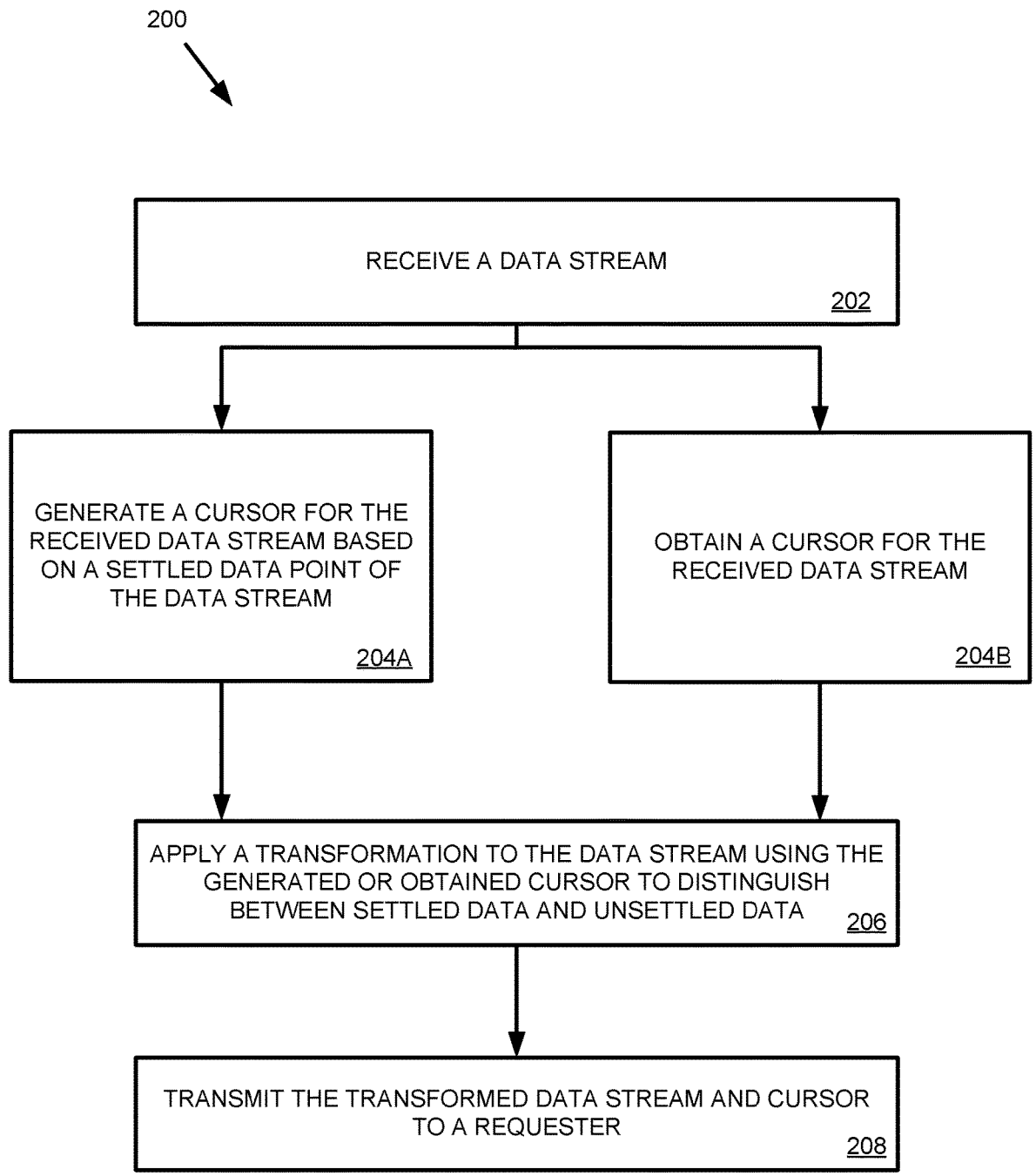
FIG. 2 is a flowchart illustrating a method for managing data latency, in accordance with various embodiments of the subject technology.

FIG. 2 depicts a method 200 for providing a transformed data stream and cursor to a requester. The requester may be, without limitation, a requesting service such as a calling function. The requester can also be a listening service which passively receives a streaming output data and cursor 110 (discussed below). In some embodiments, the requester can further process the streaming output data and cursor 110 to determine a response to the received stream. For example, a valve control system may use the streaming output data and cursor 110 to determine whether and for how long to open a valve. In some embodiments, the streaming output data and cursor 110 can be saved and stored for later review or decision validation. For example, the data can be stored in a record and later used to validate or troubleshoot past decisions, such as in the above example of a valve control system.

Referring to FIGS. 1 and 2, a cursor calculator 104 receives the N input data streams 102A-B (operation 202). The cursor calculator 104 can generate a cursor for each received streaming input data 102A-B (operation 204A). In various possible implementations, the system may also use a supplied input cursor, or may override or modify a supplied input cursor. The cursor marks a deterministic boundary where results at, or older than, the cursor are declared settled, and results newer than the cursor are unsettled. The cursor calculator 104 generates a cursor for each calculation execution and thus maintains a demarcation point which determines the amount of unsettled results. Where no calculations are executed, the cursor calculator 104 may still generate cursors for the streaming input data 102A-B. For example, a monitoring service may require only a cursor for streaming input data and therefore no calculations need be performed as only a cursor and associated stream are output from the system 100.

Further, any or all of streaming input data 102A-B can be composite streams each including multiple ultimate sources of data themselves. For example, the streaming input data 102A may be a composite stream including both streaming temperature data and streaming pressure data. The N streaming input data 102A-B may each be distinct composite pressure and temperature data streams to be processed by the system 100 in order to, for example, discern average rate of change across all monitored gas processing units.

In some embodiments, the cursor may be provided with the streaming input data (not depicted). The provided cursor may be included explicitly or be included implicitly by means of, for example, a timestamp associated with a value of the streaming input, before which the data is settled and after which the data is unsettled. Where an implicit input cursor is provided, an output cursor can be generated based on the implicit cursor by recognizing the change of values from settled to unsettled. For example, where multiple input data streams each include respective timestamps, an output cursor may be generated based on a most recent timestamp value that is identical between the multiple data streams. In contrast, an explicit cursor may be provided as a well-defined data object or reference value which unambiguously refers to a specific data point in the input stream, or timestamp between data points in the input stream, as a demarcation point between settled and unsettled data (e.g., a pointer, index, etc.).

Alternatively or supplementally, rather than computing a cursor, a cursor may instead be obtained or received in some other way (operation 204B). For example, a cursor may be attributed to a data stream through a user interface or as noted immediately above, the input data itself may include a cursor.

In another example, a pressure sensor and a temperature sensor may both stream respective timestamped measurements to the cursor calculator 104. Further, the temperature sensor may update once every minute while the pressure sensor updates once every second. However, neither stream may provide an explicit input cursor. In such a case, the cursor calculator 104 may identify the last shared timestamp between the pressure sensor stream and the temperature sensor stream, and generate a cursor associated with the location of the composite input stream. However, basing the cursor on a timestamp generally, and specifically on the last shared timestamps of the streams themselves are examples, and the cursor may be based on other information. For example, the cursor may be based on some time attribute but not necessarily a timestamp within the stream or streams themselves, such as a separate time stream, metadata related to a stream where the metadata includes a time attribute, relative time attributes related to receipt of the stream at whatever device is receiving the stream or streams, etc. Similarly, the cursor does not have to be bound to a key in the data stream such as an actual time value. In another example, the cursor may be based on timestamp values of the stream, examples of keys, but not tied to a specific time stamp value of the stream. The cursor may also be based on some other attribute of the data besides time or timestamps whether the attribute is a key of the stream or not.

To be clear, multiple cursors may be generated along multiple dimensions of data or a single cursor may be complex (e.g., cursors reflecting splines or surfaces rather than single numbers). For example, and without imputing limitation, a cave mapping system may generate streaming mapping data from one or more probes and sensors. As the three-dimensional structure is mapped and data is accordingly streamed to a receiver, a cursor may demarcate the spatial coordinates of certain, or fully mapped, portions of the cave as compared to the in process or still rendering portions (e.g., still awaiting complete data from every sensor and probe).

Once generated, the cursor may then be combined with the corresponding streaming input data to generate streams 106A-B, which may be provided to a transformation 108. Transformation 108 can then be applied to the composite streams 106A-B to generate a streaming output data and an output cursor 110 (operation 206). The output cursor may be generated as part of the transformation. In some embodiments, the output cursor may be substantially similar to the cursor generated by the cursor calculator 104. For example, where a single, non-composite stream of input data is processed by the system 100 and includes an explicit input cursor as part of the metadata of the stream, the output cursor can be substantially identical to the received explicit input cursor. A substantially identical cursor may, for example, refer to the same relative data point within the sequence of data points comprising the stream. For example, an input stream having a first, second, and third value may be received with a cursor referring to the second value. An output stream having correspondingly transformed first, second, third values may be generated with an output cursor.

In such a case, substantially similar input and output cursors may respectively refer to the second and transformed second values of the input and output streams.

In some embodiments, the output cursor may be substantially transformed due to the nature of the transformation 108 applied. For example, where the system 100 receives a large plurality of composite heat and pressure sensor streams having respective input cursors. The generated output data and output cursor 110 can constitute an average rate of change across all sensor inputs. In such a case, the transformation 108 may apply a variety of calculations accounting for variable latency and update frequency across all the streams, and thus generate a completely distinct output cursor that refers to a relative data point in the output sequence that is different than any single input cursor reference point.

The transformation 108 can be performed in either a partitioned process or a non-partitioned process, as further discussed below. Further, the transformation 108 can include multiple, different transformations applied to different input streams, or a singular transformation applied to multiple input streams collectively or individually.

Figure 3:
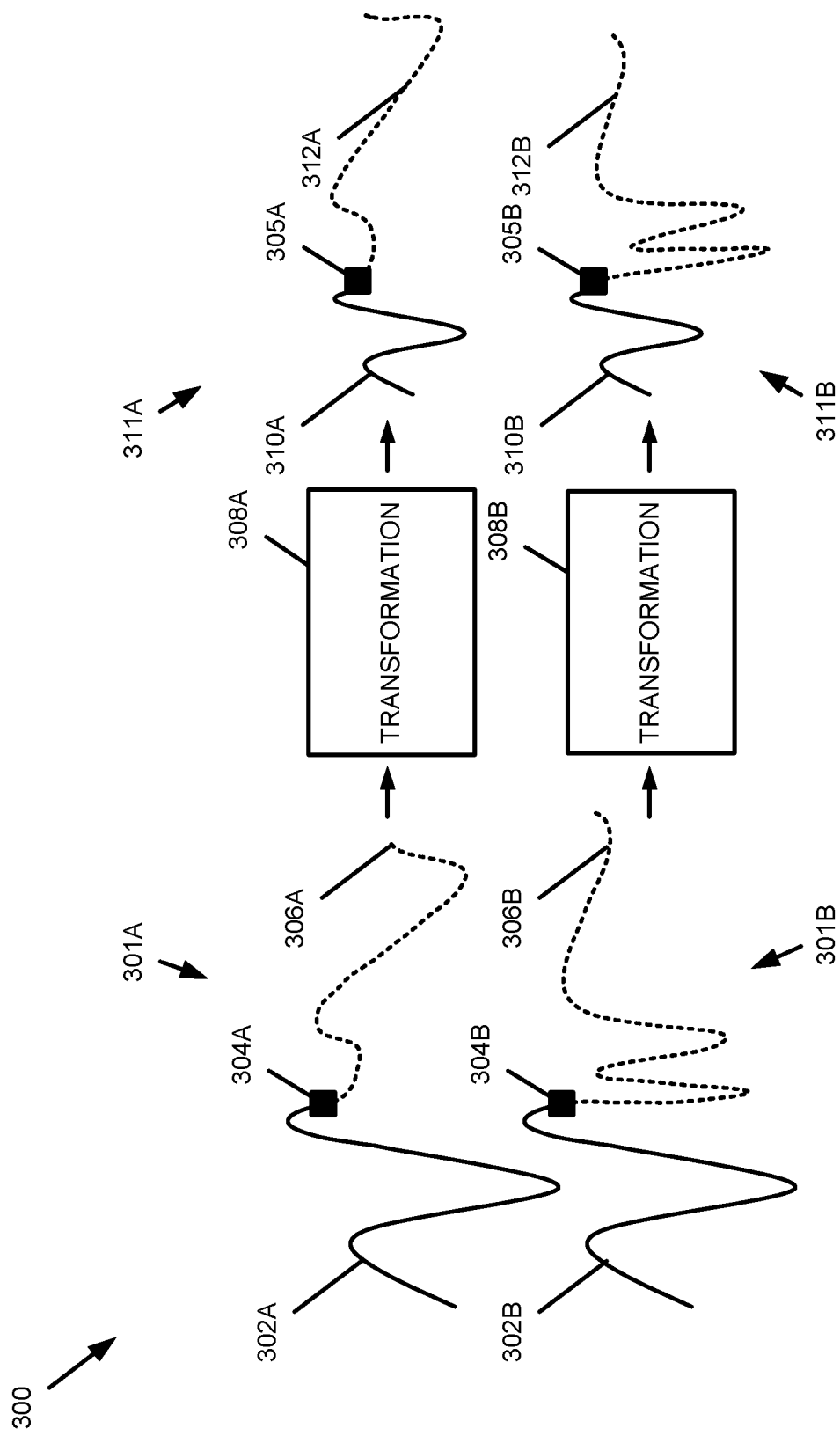
FIG. 3 is an illustration of a process for applying transformations to streaming data, in accordance with various embodiments of the subject technology.

Turning to FIG. 3, a process 300 for applying two transformations to two data streams is depicted. Transformations 308A and 308B receive input streams 301A and 301B, respectively. The input stream 301A can include an input cursor 304A which demarcates a stream portion 302A that is settled and a stream portion 306A that is unsettled or provisional and subject to change. An output stream 311A and an output cursor 305A are generated together. Where the output cursor 305A is coupled to the output stream 311A, the stream is demarcated into a settled stream portion 310A and an unsettled stream portion 312A, similarly to the input stream.

In some embodiments, the input stream 301A may be recorded in, for example, a database and thus the settled values 302A may be catalogued as being settled in the record, and updated accordingly as the stream continues to provide updates. Similarly, the output stream 311A may be recorded and the associated settled values 310A may also be catalogued as being settled in the record. Accordingly, the cursors 304A and 305A can be used to update this record on a rolling or streaming basis.

In some embodiments, data may be received in batches spanning multiple data points. For example, a pressure sensor may transmit a minute of sensor data which is measured every one second. As a result, the streamed data consists of batches of 60 sequential data points every minute. In the case of streamed batches, the input cursor 304A may be included with the batch and denote the most recent settled data point in the batch. Continuing the example, the pressure sensor readings may only be settled for the first 30 seconds of the batch update, while the second 30 seconds of readings may be of varying levels of unsettledness. In such a case, the input cursor 304A demarcates the 30 seconds of settled pressure sensor readings 302A from the second thirty seconds of pressure sensor readings 306A.

Further, the transformation 308A may, for example, estimate a temperature to the nearest whole number from the pressure sensor readings. In which case, the generated output stream 311A of batched data can include an output cursor 305A demarcating the first 35 seconds of the transformed batch update 310A as being settled values from the remaining 25 seconds of the transformed batch update 312A which are unsettled. In such a case, the transformation 308A was able to generate settled data from unsettled data because, for example, the conversion from pressure to temperature, measured to a low significant figure, only needed a pressure value being settled to a certain degree rather than being completely settled.

An input cursor 304B is provided with the input stream 301B and, similarly to the above, demarcates the input stream 301B into a stream portion 302B that is settled and a stream portion 306B that is unsettled. When the transformation 308B is applied to the input stream 301B, an output stream 311B and output cursor 305B are generated. The output cursor 305B demarcates a settled output stream portion 310B and an unsettled output stream portion 312B. In this example, the input stream 301B is provided such that the cursor 304B and settled stream portion 302B are identical to input stream 301A's cursor (304A) and settled stream portion (302A). Note that the unsettled stream portions (306A and 306B) are quite different. If both identical input streams undergo the same transformation, they will produce the same output cursors (305A and 305B) and settled stream results (310A and 310B). To put it another way—unsettled input data does not influence the position of the output cursor or settled stream results; unsettled input data can only influence the output of unsettled data. We see that in 312A and 312B—the unsettled output stream results differ accordingly with their unsettled inputs.

Figure 4:
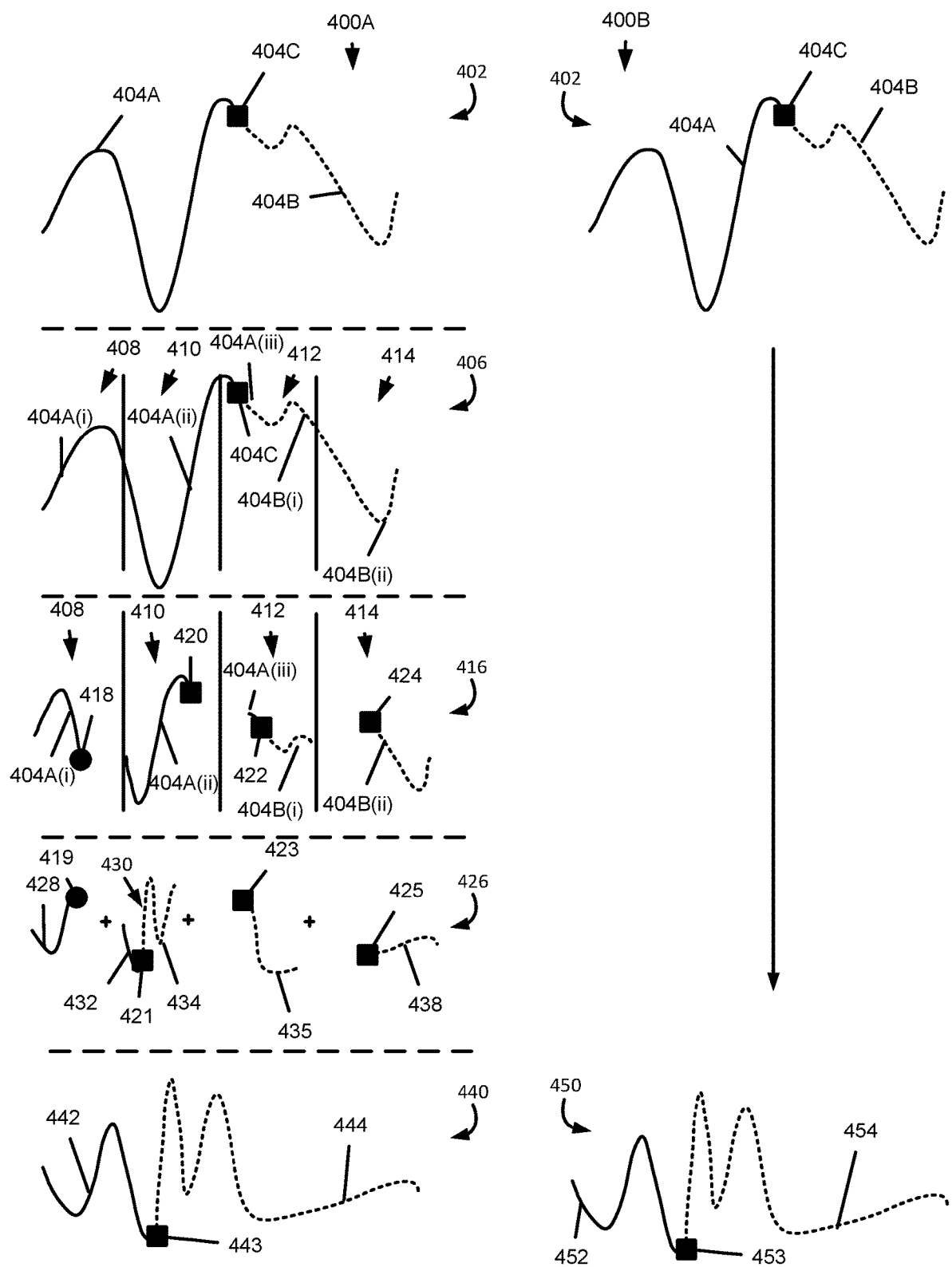
FIG. 4 is an illustration of processes for applying transformations to streaming data, in accordance with various embodiments of the subject technology.

FIG. 4 depicts a partitioned transformation 400A alongside a corresponding non-partitioned transformation 400B. Both transformations 400A and 400B receive an input stream 402. The input stream 402 is received with an input cursor 404C which refers to a demarcation data point separating the settled values of the stream 404A from the unsettled values of the stream 404B.

Whereas the transformation process 400B transforms the entirety of the stream in a single process, the transformation process 400A first generates a set of partitions 406. Each partition 408, 410, 412, and 414 can perform a calculation on respective portions of the input stream 402. Some partitions may receive portions of the stream 404A(i) and 404A(ii) preceding the input cursor 404C. These partitions may ignore the input cursor 404C and perform respective calculations accordingly because their respective data points are guaranteed to be settled values as they precede the cursor.

A set of partitions 416 includes the partitions 408, 410, 412, and 414 along with respective cursor copies 418, 420, 422, and 424. While the discussed partitions receive individual copies of a cursor, it is understood that other implementations may serve to embody the disclosed technology. For example, each partition may receive a reference to a share cursor. The input cursor copy 418 indicates a point outside a respective span of consideration of the partition 408 and so the partition 408 may be able to optimize the transformation. In other words, the cursor copy 418 will not cause a change in the method and/or state related to the transformation process performed by the partition 408 on the portion 404A(i) of the data stream. In such an example, the cursor is positioned such that the transformation is entirely settled or unsettled.

As an example of a change in the method and/or state related to the transformation process stated above, a smoothing transformation might smooth an air temperature feed consisting of a local outdoors air temperature sensor data stream and a weather forecasting data stream. The air temperature feed may further be associated with a cursor as elsewhere discussed in this disclosure. The smoothing transformation might smooth only the local outdoor air temperature sensor feed up until a point on the air temperature feed associated with the cursor. For feed data after the cursor, the smoothing transformation may switch to smoothing the weather forecasting data stream. In the partitioned system, the partitions containing data preceding the cursor would smooth the local outdoor air temperature sensor feed component of the data stream, the partitions containing data following the cursor would smooth the weather forecasting data stream component, and the partition (or partitions) containing data spanning both sides of the cursor would accordingly smooth portions of both the local outdoor air temperature sensor feed component and the weather forecasting data stream component based on the location of the cursor within the partition.

Partitions 412 and 414 may factor the respective input cursor copies 422 and 424 into their transformations because the respective portions of the data stream 404B(i) and 404B(ii) partially or entirely follow a demarcation point contained in the cursor copies (a point indicated by the cursor 404C). Here, the partition 412 receives a portion of the stream 404B(i) straddling the input cursor copy 422 and may process the stream in a similar manner to the non-partitioned transformation 400B (processing together the portions preceding a cursor and portions following a cursor). Partitions containing portions of the stream 404B(ii) entirely following the cursor 404C can perform the entirety of their respective calculations factoring in the cursor 404C.

In some cases, a partition can receive a cursor copy that contains a demarcation point located outside the span of the stream, but may still be factored into the transformation due to relative proximity or for other purposes. Here, partition 410 receives the input cursor copy 420 along with the stream portion 404A(ii). Though the received stream portion precedes the original input cursor 404C, the cursor is still factored into the calculations of partition 410 due to proximity. As a result, an output cursor 421 is generated that indicates a demarcation point along the output stream 430 produced by the partition 410.

The partitions 408, 410, 412, and 414 produce a set 426 of respective output streams 428, 430, 436, and 438. Each output stream contains a respective output cursor 419, 421, 423, and 425 which incorporates the transformation applied to the input stream to provide a demarcation point. In some cases, the demarcation point will be located within the stream corresponding to the output cursor. Here, the output stream 430 is coupled to the output cursor 421 which demarcates the output stream 430 into a preceding output portion 432 and a following output portion 434 (indicating settled and unsettled values, respectively). Upon the partitioned output streams 428, 430, 436, and 438 being "stitched" together, a consolidated output stream 440 is generated and represents a transformation fully applied to the original input stream 402. The stitching operation may be a simple concatenating function applied to the output stream segments in appropriate sequence, or it may involve more complex algorithms incorporating, for example, averaging functions and the like.

The consolidated output stream 440 can be output with an output cursor 443 which demarcates a preceding, settled portion of the stream 442 and a following, unsettled portion of the stream 444. The consolidated output stream 440 is identical to an output stream 450 produced by the non-partitioned transformation 400B, which is also generated with an output cursor 453, which demarcates a preceding, settled portion of the stream 452 and a following, unsettled portion of the stream 454.

Turning again to FIGS. 1 and 2, a requester 112 can then receive the streaming output data and output cursor 110

(operation 208). In some embodiments, the requester 112 can be a computer 114. The output stream may be produced by either a partitioned or non-partitioned transformation as discussed above. The output cursor of the streaming output 110 can be used by the requester 112 to identify results of the transformation that are either settled and invariant or provisional and subject to change.

Figure 5:
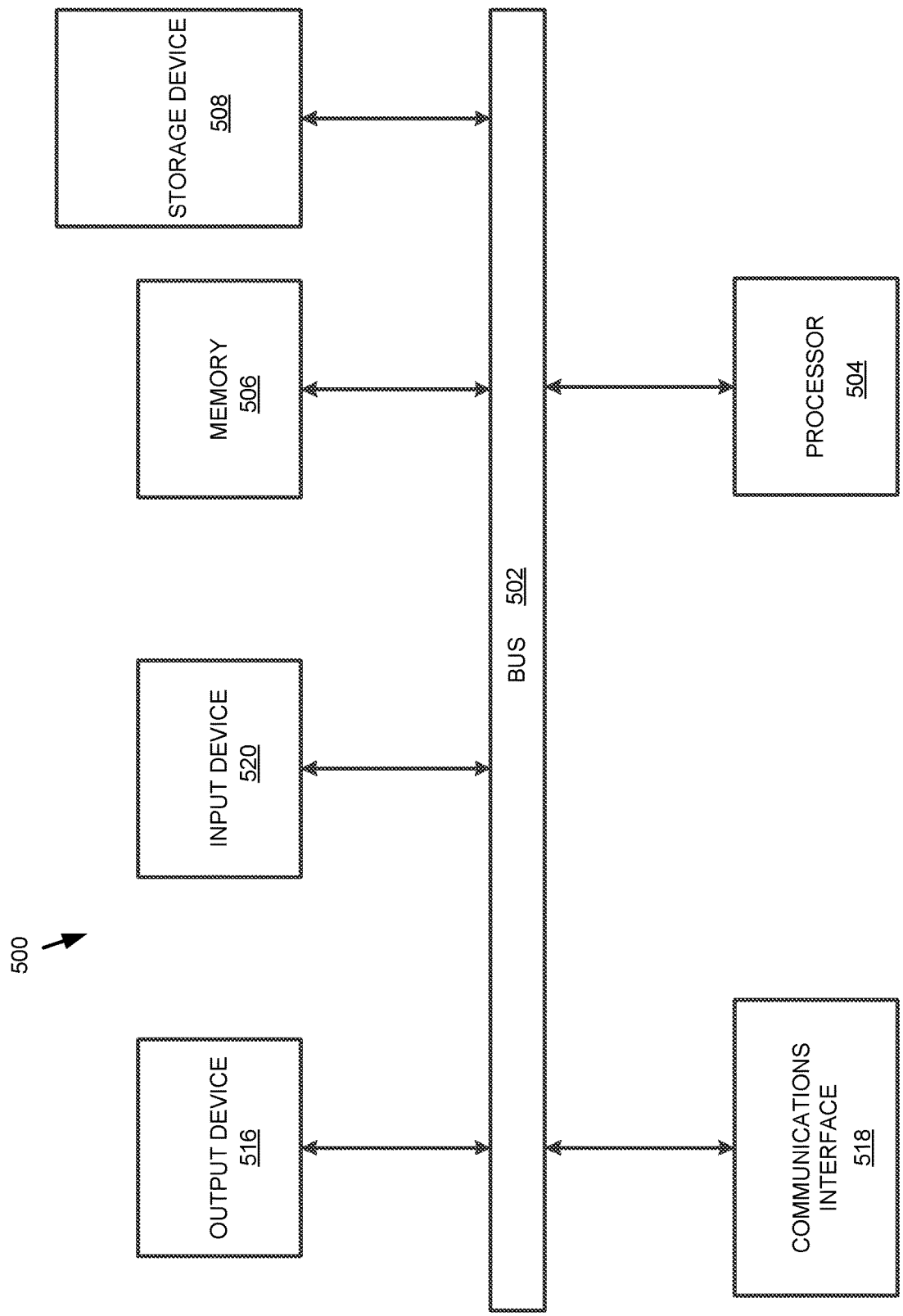
FIG. 5 is a system diagram of an example computing system that may implement various systems and methods discussed herein, in accordance with various embodiments of the subject technology.

FIG. 5 is an example computing system 500 that may implement various systems and methods discussed herein. The computer system 500 includes one or more computing components in communication via a bus 502. In one implementation, the computing system 500 includes one or more processors 504. The processor 504 can include one or more internal levels of cache (not depicted) and a bus controller or bus interface unit to direct interaction with the bus 502. The processor 504 can perform calculations on data, including transformations 108, 308A-B, and 400A-B and specifically implements the various methods discussed herein. Main memory 506 may include one or more memory cards and a control circuit (not depicted), or other forms of removable memory, and may store various software applications including computer executable instructions, that when run on the processor 504, implement the methods and systems set out herein. Other forms of memory, such as a storage device 508, may also be included and accessible, by the processor (or processors) 504 via the bus 502.

The computer system 500 can further include a communications interface 518 by way of which the computer system 500 can connect to networks and receive data useful in executing the methods and system set out herein as well as transmitting information to other devices. In some embodiments, the communications interface 518 may receive streaming input data 102A-B, 302A-B and/or 402 via, for example, the internet. The computer system 500 can include an output device 516 by which information is displayed, such as a display (not depicted). The computer system 500 can also include an input device 520 by which information, such as streaming input data 102A-B, is input. Input device 520 can also be a scanner, keyboard, and/or other input devices for human interfacing as will be apparent to a person of ordinary skill in the art. The system set forth in FIG. 5 is but one possible example of a computer system that may employ or be configured in accordance with embodiments of the present disclosure. It will be appreciated that other non-transitory tangible computer-readable storage media storing computer-executable instructions for implementing the presently disclosed technology on a computing system may be utilized.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the methods can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a computer-readable storage medium having stored thereon instructions, which may be used to program a computer system (or other electronic devices) to perform a process according to the present disclosure. A computer-readable storage medium includes any mechanism for storing information in a form (e.g., software, processing application) readable by a computer. The computer-readable storage medium may include, but is not limited to, optical storage medium (e.g., CD-ROM), magneto-optical storage medium, read only memory (ROM), random access memory (RAM), erasable programmable memory (e.g., EPROM and EEPROM), flash memory, or other types of medium suitable for storing electronic instructions.

The description above includes example systems, methods, techniques, instruction sequences, and/or computer program products that embody techniques of the present disclosure. However, it is understood that the described disclosure may be practiced without these specific details.

While the present disclosure has been described with references to various implementations, it will be understood that these implementations are illustrative and that the scope of the disclosure is not limited to them. Many variations, modifications, additions, and improvements are possible. More generally, implementations in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method for generating a data set, the method comprising:
   accessing, by a hardware processor, a data set of streamed sensor data and a reference object, the data set ordered along a dimension and the reference object demarcating a first ordered portion of the data set from a second ordered portion of the data set, and the first ordered portion preceding the reference object along the dimension and the second ordered portion following the reference object along the dimension, wherein values of the first ordered portion are settled and values of the second ordered portion are unsettled;
   dividing, by the hardware processor, the data set into a first partition including a first portion of the data set and second partition including a second partition of the data set;
   optimizing, by the hardware processor, one of a first transformation or a second transformation based on a relative position along the dimension of the reference object to one of the first portion of the data set and the second portion of the data set, and yielding one of an optimized first transformation or an optimized second transformation;
   applying, by the hardware processor, one of the first transformation or the optimized first transformation to the first portion of the data set, and yielding a transformed first portion of the data set;
   applying, by the hardware processor, one of the second transformation or the optimized second transformation to the second portion of the data set, and yielding a transformed second portion of the data set; and
   generating, by the hardware processor, an aggregated data set comprising the reference object, the transformed first portion of the data set and the transformed second portion of the data set.

2. The method of claim 1, further comprising dividing, by the hardware processor, the data set into a first partition and a second partition including the second portion of the data set; and providing a first copy of the reference object to the first partition and a second copy of the reference object to the second partition, and wherein optimizing one of the first transformation or the second transformation is based on a relative position along the dimension of one of the first copy of the reference object and the second copy of the reference object.

3. The method of claim 1, further comprising outputting a reference object demarcating a first portion of the aggregated data set from a second portion of the aggregated data set.

4. The method of claim 2, wherein one of the first partition or the second partition comprises a plurality of partitions and each partition of the plurality of partitions comprises a portion of the data set, and wherein one of a transformation or an optimized transformation is applied to each of the plurality of partitions.

5. The method of claim 4, wherein each partition of the plurality of partitions receives a copy of the reference object.

6. The method of claim 2, wherein the entirety of the data set is contained across an aggregation of the partitions.

7. The method of claim 1, wherein one of the optimized first transformation and the optimized second transformation includes fewer calculations than one of the first transformation or the second transformation, and wherein one of the first transformation or the second transformation is optimized based on the reference object being positioned along the dimension after one of the first portion of the data set or the second portion of the data set.

8. The method of claim 1, wherein the reference object is positioned along the dimension at an interim point of one of the first portion of the data set and the second portion of the data set, the interim point between a first point and a second point of one of the first portion of the data set and the second portion of the data set, and wherein one of the optimized first transformation or the optimized second transformation includes a first set of calculations applied to points preceding the interim point and a second set of calculations applied to points following the interim point.

9. A non-transitory computer-readable medium storing instructions that, when executed by one or more processors, cause the one or more processors to:

access a data set of streamed sensor data and a reference object, the data set ordered along a dimension and the reference object demarcating a first ordered portion of the data set from a second ordered portion of the data set, and the first ordered portion preceding the reference object along the dimension and the second ordered portion following the reference object along the dimension, wherein values of the first ordered portion are settled and values of the second ordered portion are unsettled;

dividing the data set into a first partition including a first portion of the data set and second partition including a second partition of the data set;

optimize one of a first transformation or a second transformation based on a relative position along the dimension of the reference object to one of the first portion of the data set and the second portion of the data set, and yielding one of an optimized first transformation or an optimized second transformation;

apply one of the first transformation or the optimized first transformation to the first portion of the data set, and yielding a transformed first portion of the data set;

apply one of the second transformation or the optimized second transformation to the second portion of the data set, and yielding a transformed second portion of the data set; and generate an aggregated data set comprising the transformed first portion of the data set and the transformed second portion of the data set, and an output reference object demarcating a first portion of the aggregated data set from a second portion of the aggregated data set.

10. The non-transitory computer-readable medium of claim 9, further comprising instructions, that when executed by one or more processors, cause the one or more processors to wherein one of the first partition and the second partition comprises a plurality of partitions and each partition of the plurality of partitions comprises a distinct portion of the data set, and wherein one of a transformation or an optimized transformation is applied to each of the plurality of partitions.

* * * * *